(12) United States Patent
Fujikawa et al.

(10) Patent No.: US 8,377,184 B2
(45) Date of Patent: Feb. 19, 2013

(54) $CO_2$ RECOVERY APPARATUS AND $CO_2$ RECOVERY METHOD

(75) Inventors: Keiji Fujikawa, Hiroshima (JP); Takuya Hirata, Hiroshima (JP); Tatsuya Tsujiuchi, Hiroshima (JP); Tsuyoshi Oishi, Aichi (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 520 days.

(21) Appl. No.: 12/606,620

(22) Filed: Oct. 27, 2009

(65) Prior Publication Data

US 2010/0218674 A1 Sep. 2, 2010

(30) Foreign Application Priority Data

Feb. 27, 2009 (JP) ................................ 2009-047240

(51) Int. Cl.
*B01D 53/14* (2006.01)
(52) U.S. Cl. .............. 96/234; 95/183; 95/236; 423/219; 423/220
(58) Field of Classification Search .................. None
See application file for complete search history.

(56) References Cited

U.S. PATENT DOCUMENTS

| | | | |
|---|---|---|---|
| 2,904,393 A | | 9/1959 | Frejacques et al. |
| 4,542,114 A | * | 9/1985 | Hegarty ......................... 502/39 |
| 6,174,506 B1 | * | 1/2001 | Chakravarti et al. .......... 423/220 |
| 6,582,671 B1 | * | 6/2003 | Iijima et al. ................... 423/219 |
| 7,871,457 B2 | * | 1/2011 | Shah et al. ......................... 95/96 |
| 2003/0031618 A1 | | 2/2003 | Minkkinen |
| 2007/0232706 A1 | * | 10/2007 | Shah et al. ...................... 518/703 |
| 2008/0056972 A1 | * | 3/2008 | Iijima ............................. 423/220 |
| 2008/0236398 A1 | * | 10/2008 | Zhang et al. ..................... 96/235 |
| 2010/0251887 A1 | * | 10/2010 | Jain .................................... 95/46 |
| 2010/0263529 A1 | * | 10/2010 | Alban et al. ........................ 95/41 |

FOREIGN PATENT DOCUMENTS

| | | |
|---|---|---|
| EP | 0 551 876 A2 | 7/1993 |
| EP | 1059110 A1 | 12/2000 |
| EP | 1900415 A1 | 3/2008 |
| JP | 62-256708 A | 11/1987 |
| JP | 1-290517 A | 11/1989 |

(Continued)

OTHER PUBLICATIONS

Siva Ariyapadi, et al., "Study evaluates design of high-capacity CO2 injection plants," Oil and Gas Journal, Sep. 4, 2006, pp. 74-84. Cited in Spec.

(Continued)

*Primary Examiner* — Duane Smith
*Assistant Examiner* — Pankti Patel
(74) *Attorney, Agent, or Firm* — Westerman, Hattori, Daniels & Adrian, LLP (57) ABSTRACT

A $CO_2$ recovery apparatus according to a first embodiment of the present invention includes: a $CO_2$ absorber that brings flue gas containing $CO_2$ into contact with $CO_2$ absorbing liquid to reduce $CO_2$ in the flue gas; a regenerator that reduces $CO_2$ in $CO_2$ absorbing liquid (rich solvent) that has absorbed the $CO_2$ in the $CO_2$ absorber to regenerate the $CO_2$ absorbing liquid, so that the regenerated absorbing liquid (lean solvent), having $CO_2$ reduced in the regenerator, is reused in the $CO_2$ absorber; a first compressor to a fourth compressor that compress the $CO_2$ gas released from the regenerator; and an $O_2$ reducing apparatus arranged between the second compressor and a second cooler to reduce $O_2$ in the $CO_2$ gas.

10 Claims, 6 Drawing Sheets

FOREIGN PATENT DOCUMENTS

| | | | |
|---|---|---|---|
| JP | 10-130009 | A | 5/1998 |
| JP | 3663117 | B2 | 6/2005 |
| JP | 2007-137725 | A | 6/2007 |
| JP | 2008-62165 | A | 3/2008 |
| RU | 2 239 488 | C2 | 11/2004 |
| RU | 2005 131 195 | A | 2/2006 |
| WO | 00/48709 | A1 | 8/2000 |
| WO | 2009/010690 | A2 | 1/2009 |

OTHER PUBLICATIONS

Alireza Bahadori, et al.,"New equations estimate acid-gas solubility in TEG", Oil and Gas Journal, Feb. 27, 2006, pp. 55-59.

Masaki Iijima, "Flue Gas CO2 Recovery, Its Application and Cost Analysis for EOR," Mitsubishi Heavy Industries Newsletter, Nov. 1998, pp. 410-413, vol. 35, No. 6.

Decision of a Patent Grant dated Feb. 22, 2011, issued in corresponding Russian Patent Application No. 2009140127/05(056948).

Decision of a Patent Grant dated Apr. 19, 2011, issued in corresponding Japanese Patent Application No. 2009-047240.

European Search Report dated Jul. 28, 2010, issued in corresponding European Patent Application No. 09174362.5.

Australian Office Action dated Jul. 6, 2010, issued in corresponding Australian Patent Application No. 2009230804.

* cited by examiner

$CO_2$ RECOVERY APPARATUS AND $CO_2$ RECOVERY METHOD

BACKGROUND OF THE INVENTION

1. Field of the Invention

The present invention relates to a $CO_2$ recovery apparatus and a $CO_2$ recovery method for reducing $CO_2$ in flue gas by allowing $CO_2$ absorbing liquid to absorb $CO_2$ contained in the flue gas, and for regenerating and reusing the $CO_2$ absorbing liquid.

2. Description of the Related Art

It has come to be pointed out that one of the causes of the global warming is a greenhouse effect of $CO_2$, and it has become an urgent task, also internationally, to provide a countermeasure for $CO_2$ to protect the global environment against the warming. $CO_2$ is generated by any human activities combusting fossil fuels, and there are increasing demands for suppressing $CO_2$ emissions. Along with such an increasing demand, researchers are energetically investigating for a method for reducing and recovery $CO_2$ included in flue gas to apply in a power plant that consumes a large amount of fossil fuels, such as a thermal plant. In such a method, flue gas, emitted from a steam generator, is brought into contact with an amine-based $CO_2$ absorbing liquid (hereinafter, also simply referred to as "absorbing liquid") to allow such absorbing liquid to absorb $CO_2$, and the recovered $CO_2$ is stored therein without being released into the air.

Japanese Application Laid-open No. 2008-62165, for example, discloses a method for allowing an absorbing liquid, such as the one mentioned above, to absorb $CO_2$ in flue gas to reduce the $CO_2$ contained therein, and releasing and recovery the $CO_2$ therefrom. In this method, the absorbing liquid is also regenerated, circulated back to a $CO_2$ absorber, and reused.

Figure 4:
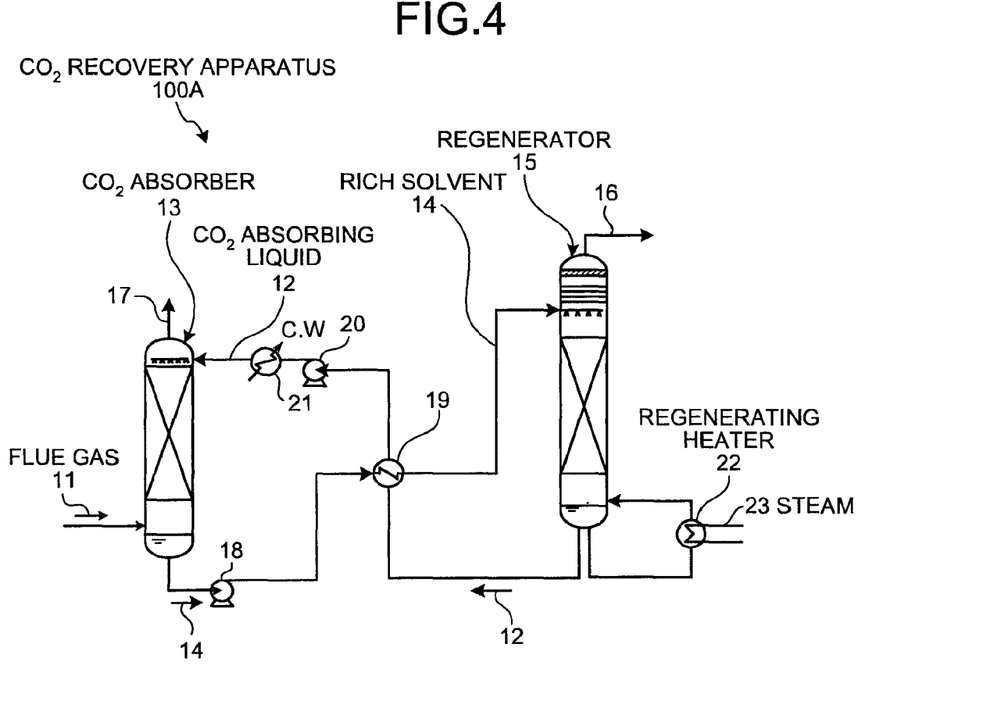
FIG. 4 is a schematic of an exemplary structure of a conventional $CO_2$ recovery apparatus.

An example of a conventional $CO_2$ recovery apparatus is shown in FIG. 4. A conventional $CO_2$ recovery apparatus 100A includes a $CO_2$ absorber 13 and a regenerator 15. The $CO_2$ absorber 13 brings flue gas 11, containing $CO_2$ emitted from industrial combustion facilities such as a steam generator or a gas turbine, into contact with $CO_2$ absorbing liquid 12 to absorb $CO_2$, thus reducing the $CO_2$ contained in the flue gas 11. The regenerator 15 allows $CO_2$ absorbing liquid (hereinafter, also referred to as "rich solvent") 14 that has absorbed the $CO_2$ to release the $CO_2$ contained therein so that the $CO_2$ absorbing liquid (hereinafter, also referred to as "lean solvent") 12 can be regenerated.

In FIG. 4, the reference numeral 17 denotes to flue gas having $CO_2$ reduced in the $CO_2$ absorber 13; the reference numeral 18 denotes to a rich solvent pump for pumping the rich solvent 14 into the regenerator 15; the reference numeral 19 denotes to a rich/lean solvent heat exchanger that exchanges heat between the rich solvent 14 and the lean solvent 12; the reference numeral 20 denotes to a lean solvent pump that pumps the regenerated $CO_2$ absorbing liquid 12 into the $CO_2$ absorber 13; the reference numeral 21 denotes to a lean solvent cooler that cools the lean solvent 12; the reference numeral 22 denotes to a regenerating heater; and the reference numeral 23 denotes to steam.

In the $CO_2$ recovery apparatus 100A, the regenerator 15 reduces $CO_2$ in the $CO_2$ absorbing liquid 14 so as to enable the regenerated $CO_2$ absorbing liquid 12 to be reused in the $CO_2$ absorber 13 as $CO_2$ absorbing liquid. $CO_2$ gas 16 removed in the regenerator 15 is compressed in a compressor, injected into underground oilfield, and used for enhanced oil recovery (EOR) or stored in an aquifer as a countermeasure for global warming. The $CO_2$ gas 16 may also be used as synthetic raw material for chemical products.

Figure 5:
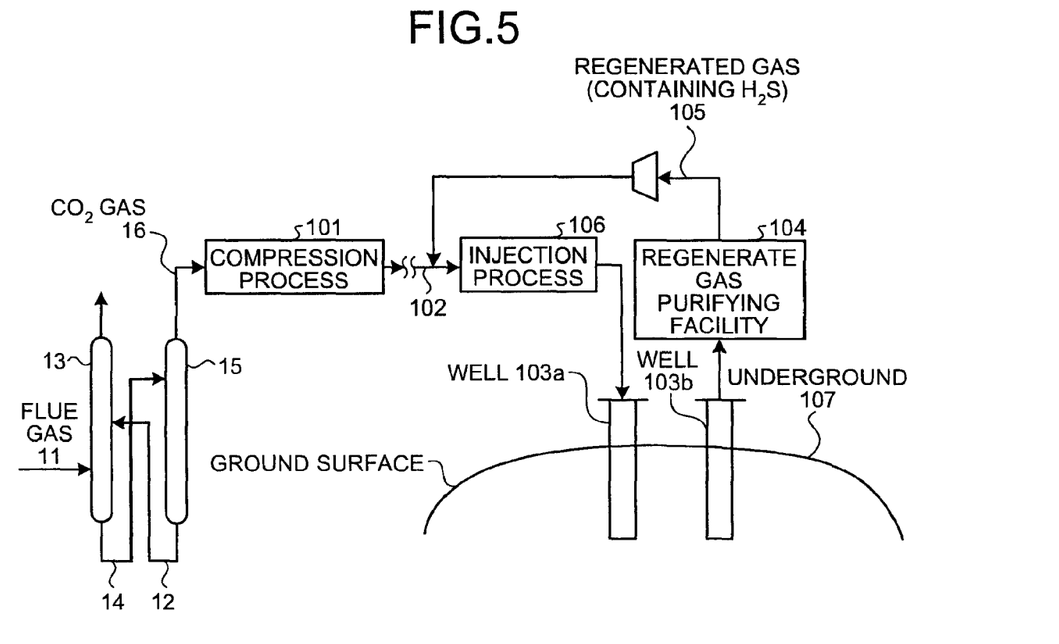
FIG. 5 is a schematic of a process of recovery $CO_2$ gas from flue gas, and storing the same into underground.

FIG. 5 is an example of a process of injecting the $CO_2$ gas 16 recovered in the regenerator 15 into underground. The $CO_2$ gas 16 recovered in the regenerator 15 is compressed at a compression process 101, and transported to a well 103a in a storage location by way of transportation 102 such as a pipeline or a ship. At a well 103b at the storage location, the $CO_2$ is mixed with gas (hereinafter, also referred to as "regenerated gas") 105 generated upon mining crude oil in an accompanying manner, purified in a regenerate gas purifying facility 104, and injected into underground 107 by an injection process 106. At this time, if hydrogen sulfide ($H_2S$) is contained in the regenerated gas 105, oxygen ($O_2$) contained in the $CO_2$ gas 16 may react with the $H_2S$, as expressed in the following formula. By way of such a reaction, solid sulfur (S) may become deposited, and the operation of a plant may be affected:

$$2H_2S + O_2 = 2S + 2H_2O \qquad (1)$$

In addition, if moisture remaining in the $CO_2$ gas 16 is condensed during the compression, the moisture might accelerate carbonic-acid corrosion with co-existence with $O_2$.

In response to this issue, Oil & Gas Journal (issued on Sep. 4, 2006, p 74-84) discloses a method for preventing solid sulfur (S) deposition or carbonic-acid corrosion. In this method, $N_2$ gas and alike is introduced upon starting and stopping a compressor, so that sulfur or $O_2$ remaining in the compressor or a pipe is reduced.

In addition, if the recovered $CO_2$ gas 16 is to be used as a raw material for chemical products, the synthetics may be colored by oxygen. To solve such a problem, it is preferred to reduce oxygen concentration in the recovered $CO_2$ gas 16. The reason why oxygen is contained in the recovered $CO_2$ gas 16 is that oxygen is mixed in the $CO_2$ gas 16 when oxygen contained in the absorbing liquid 12 in the $CO_2$ absorber 13 is released together with $CO_2$ in the regenerator 15.

Figure 6:
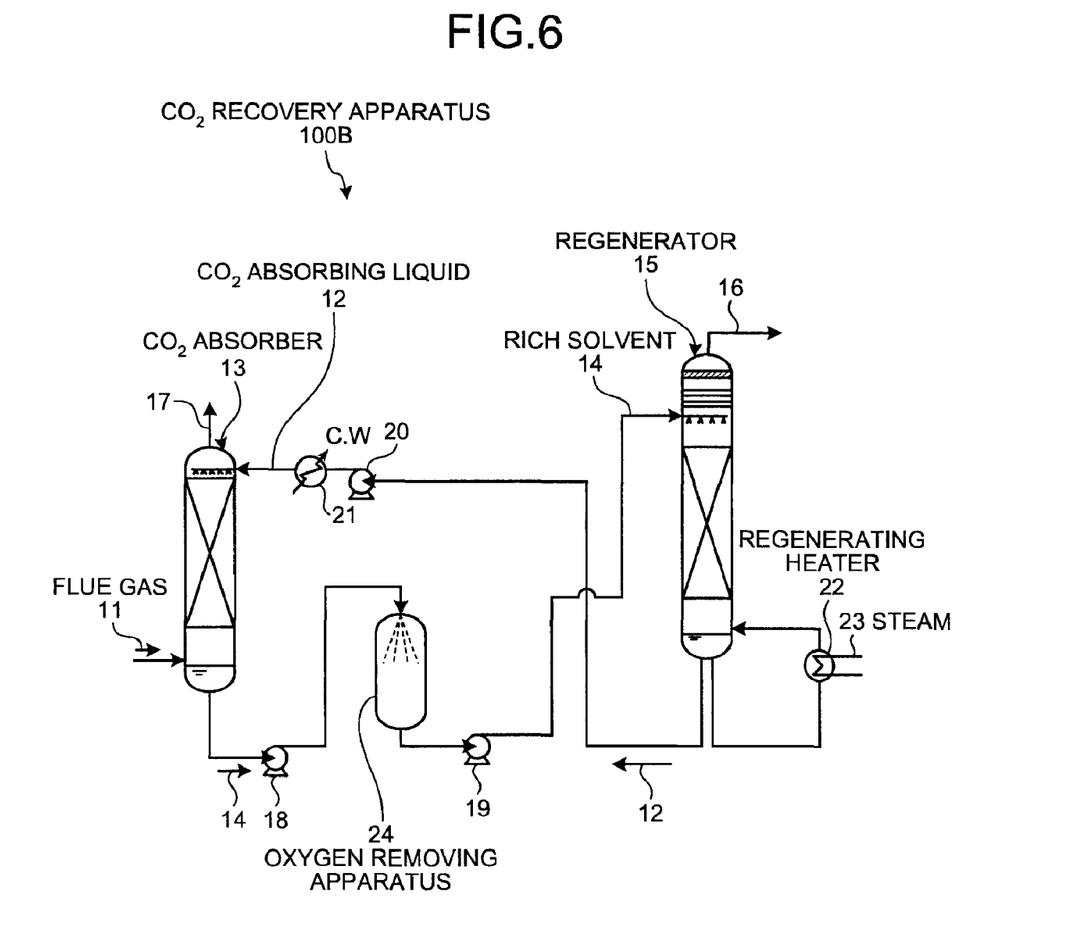
FIG. 6 is a schematic of another exemplary structure of the conventional $CO_2$ recovery apparatus.

Japanese Patent Application Laid-open No. 2007-137725, for example, discloses a method for reducing the oxygen concentration in the absorbing liquid. By this method, the oxygen dissolved in the rich solvent 14 is reduced by depressurizing the rich solvent 14 in an oxygen reducing apparatus 24, before pumping the rich solvent 14 into the regenerator 15, as shown in a $CO_2$ recovery apparatus 100B in FIG. 6.

Furthermore, Patent No. 3663117 discloses another method for reducing the oxygen dissolved in the rich solvent. By this method, $CO_2$ gas is used as oxygen-reducing gas, and the $CO_2$ gas is brought in a counter-current contact with the rich solvent, to reduce the oxygen dissolved in the rich solvent.

Figure 7:
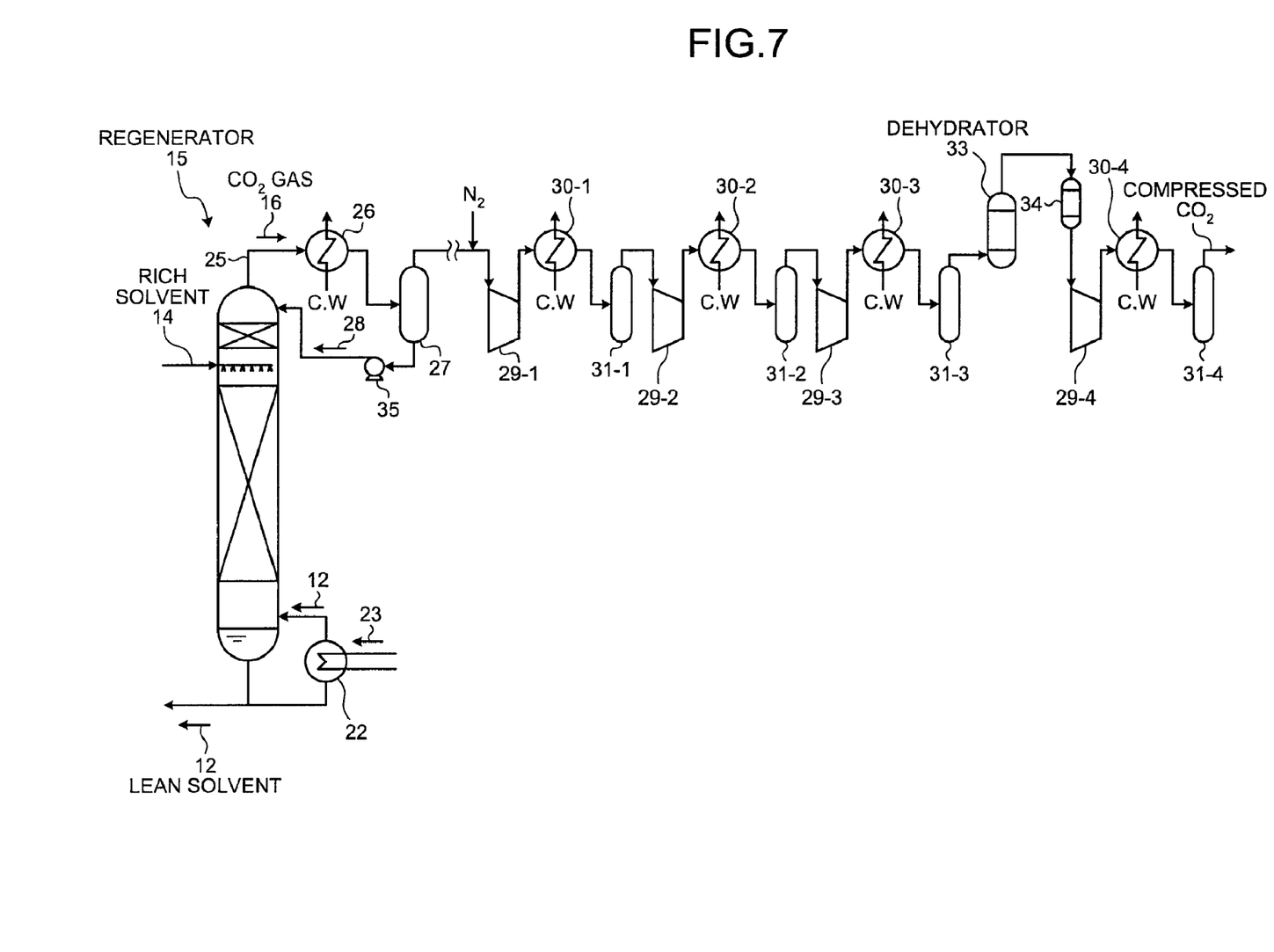
FIG. 7 is a schematic of a process of compressing $CO_2$ gas recovered in a regenerator.

FIG. 7 is a schematic of a process of compressing the recovered $CO_2$ gas in the regenerator. As shown in FIG. 7, the $CO_2$ gas 16 is released from the top of the regenerator 15, together with the steam released from rich solvent 14 and semi-lean solvent in the regenerator 15, via a gas ejecting line 25. The steam is then condensed in a condenser 26, and water 28 is separated in a separating drum 27. The $CO_2$ gas 16 including the steam is released out of the system, and the pressure of the $CO_2$ gas 16, recovered in the regenerator 15, is gradually raised by way of first compressor 29-1 to fourth compressor 29-4 to compress the $CO_2$ gas 16. The compressed $CO_2$ is then recovered.

First cooler 30-1 to fourth cooler 30-4 and first separator 31-1 to fourth separator 31-4 are respectively arranged downstream of the first compressor 29-1 to the fourth compressor 29-4, respectively, to remove liquid generated while compressing the $CO_2$ gas 16. A dehydrator 33 is arranged between the third compressor 29-3 and the fourth compressor 29-4. In the dehydrator 33, the $CO_2$ gas 16 is brought into contact with dehydrating agent (molecular sieve, diethylene glycol (DEG), or triethylene glycol (TEG), for example) to remove the water and dehydrate the $CO_2$ gas 16.

In FIG. 7, the reference numeral 34 denotes to a gas-liquid separator; and the reference numeral 35 denotes to a condensed-water circulating pump that pumps the water 28, separated in the separating drum 27, to the top of the regenerator 15.

When flue gas containing $CO_2$ is brought into contact with an absorbing liquid in the $CO_2$ absorber, air bubbles can get caught in the absorbing liquid that has flowed down in the $CO_2$ absorber at the bottom thereof, and the rich solvent is sent to the regenerator with the air bubbles being caught. For example, the concentration of oxygen dissolved in the absorbing liquid is approximately several tens of parts per million with respect to the $CO_2$; on the contrary, the concentration of the oxygen getting caught in the absorbing liquid could reach approximately several hundreds of parts per million with respect to the $CO_2$. Therefore, it is necessary to remove the air bubbles getting caught in the rich solvent in the $CO_2$ absorber, to reduce the concentration of oxygen contained in $CO_2$ gas.

As described above, the amount of oxygen getting caught in the absorbing liquid as air bubbles is greater than the amount of oxygen dissolved therein. Because an objective of a conventional method for reducing oxygen is to reduce the oxygen dissolved in the absorbing liquid, motive energy is required in a depressurizing operation or in a gas supply operation to bring purge gas into counter-current contact therewith. Therefore, extra costs are accrued for $CO_2$ recovery.

SUMMARY OF THE INVENTION

According to an aspect of the present invention, a $CO_2$ recovery apparatus includes: a $CO_2$ absorber that brings flue gas containing $CO_2$ into contact with $CO_2$ absorbing liquid to reduce $CO_2$ in the flue gas; a regenerator that reduces $CO_2$ in rich solvent that has absorbed $CO_2$ in the $CO_2$ absorber, so that lean solvent having $CO_2$ reduced by the regenerator is reused in the $CO_2$ absorber; at least two compressors that compress $CO_2$ gas released from the regenerator; and an oxygen reducing apparatus that reduces $O_2$ in the $CO_2$ gas and is arranged between a first separator arranged downstream of a first compressor and a second separator arranged downstream of a second compressor.

Advantageously, in the $CO_2$ recovery apparatus, the oxygen reducing apparatus is arranged between the second compressor and a second cooler that is arranged downstream of the second compressor and upstream of the second separator.

Advantageously, in the $CO_2$ recovery apparatus, the oxygen reducing apparatus includes a combustion catalyst that reduces $O_2$ in the $CO_2$ gas.

Advantageously, in the $CO_2$ recovery apparatus, the oxygen reducing apparatus includes the combustion catalyst, and is structured as a cartridge that is configured to be assembled into a pipe for supplying compressed $CO_2$ gas, a static mixer or a honeycomb having a surface thereof applied with the combustion catalyst, or a packed bed packed with granular catalysts having a pellet or spherical shape.

Advantageously, in the $CO_2$ recovery apparatus, the combustion catalyst is a Pd-based or Pt-based metal catalyst.

Advantageously, in the $CO_2$ recovery apparatus, the oxygen reducing apparatus includes a hydrogen gas supplying unit that supplies hydrogen-rich gas.

Advantageously, in the $CO_2$ recovery apparatus, the hydrogen-rich gas is hydrogen produced by a hydrogen producing apparatus performing a reforming process and a CO shifting process and using a fossil fuel as a raw material.

Advantageously, in the $CO_2$ recovery apparatus, the hydrogen-rich gas contains CO in addition to hydrogen.

Advantageously, in the $CO_2$ recovery apparatus, the hydrogen gas supplying unit is arranged upstream of a compressor that is arranged upstream of the oxygen reducing apparatus.

According to another aspect of the present invention, a $CO_2$ recovery method includes recovering $CO_2$ using the above described $CO_2$ recovery apparatus, while reducing oxygen concentration in the $CO_2$ gas recovered from the regenerator at a process of compressing the $CO_2$ gas.

The present invention is made in consideration of the above. An object of the present invention is to provide a $CO_2$ recovery apparatus and a $CO_2$ gas recovery method for reducing concentration of oxygen contained in $CO_2$ that is recovered in a regenerator, and for suppressing problems caused by residual oxygen, such as clogging of equipment or pipes, or coloring of chemical products.

DETAILED DESCRIPTION OF THE PREFERRED EMBODIMENTS

Embodiments of the present invention will now be explained in detail with reference to the attached drawings. It should be understood that the embodiments are not intended to limit the scope of the present invention in any way. These embodiments shall be construed to include structural elements that can be easily imagined by those in the art, those that are substantially identical, and those within the scope of so-called equivalents.

First Embodiment

A $CO_2$ recovery apparatus according to a first embodiment of the present invention will now explained with reference to FIG. 1.

Figure 1:
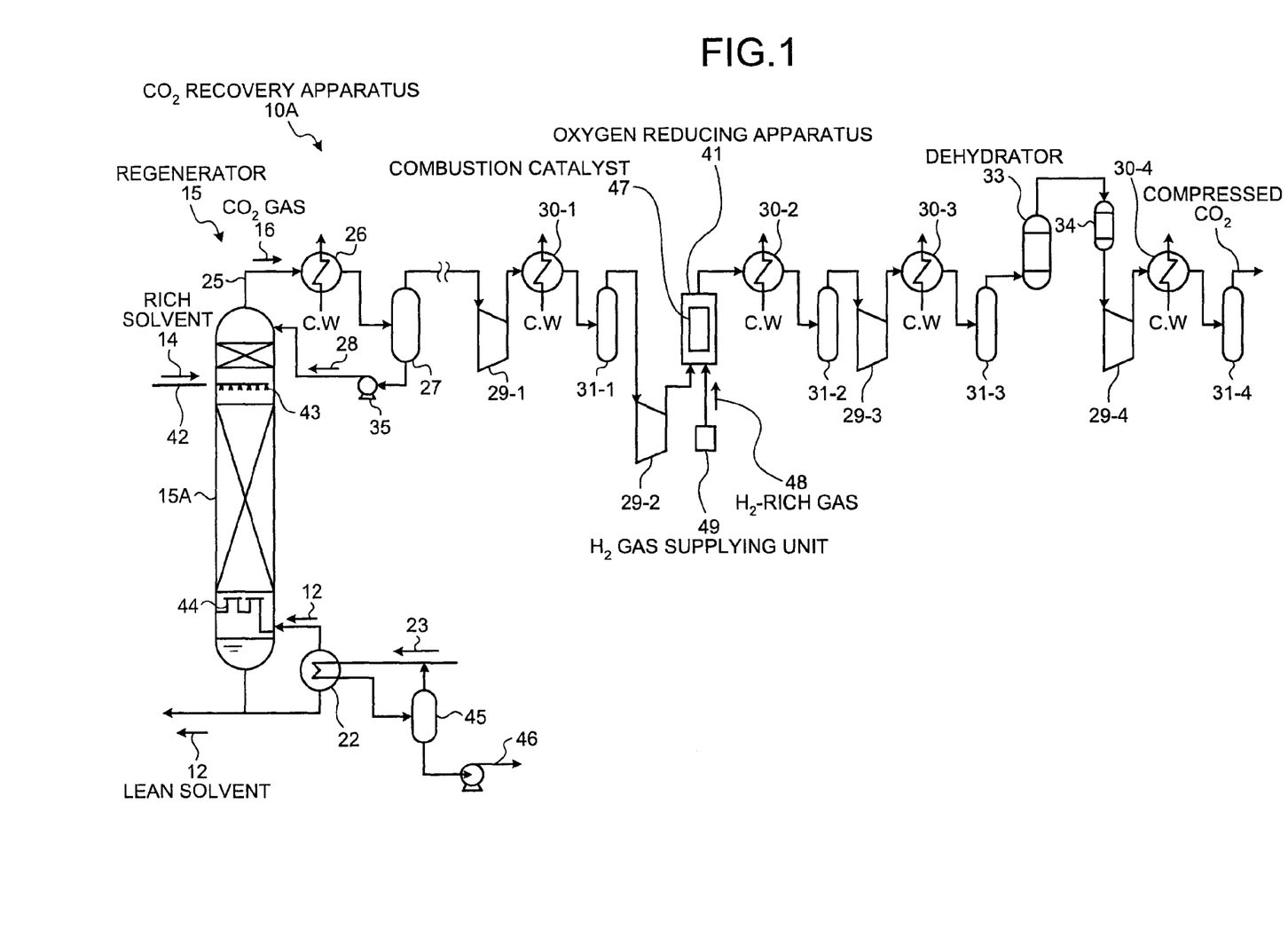
FIG. 1 is a schematic of a structure of a $CO_2$ recovery apparatus according to a first embodiment of the present invention.

FIG. 1 is a schematic of the $CO_2$ recovery apparatus according to the first embodiment. In FIG. 1, the same structures as those shown in FIGS. 4 to 7 are assigned with the same reference numerals, and redundant explanations thereof are omitted.

In the same manner as the $CO_2$ recovery apparatus shown in FIGS. 4 to 7, a $CO_2$ recovery apparatus 10A according to the first embodiment includes a $CO_2$ absorbing system for absorbing $CO_2$ in a $CO_2$ absorber; a $CO_2$ recovery/$CO_2$ absorbing liquid regenerating system for recovering $CO_2$, and regenerating $CO_2$ absorbing liquid in a regenerator; and a $CO_2$ compressing system for compressing the recovered $CO_2$ for injecting the $CO_2$ into underground or an oilfield. The $CO_2$ absorbing system, using $CO_2$ absorber 13 for absorbing $CO_2$, is same as that included in the $CO_2$ recovery apparatus shown in FIGS. 4 and 6; therefore, the explanation thereof is omitted.

As shown in FIG. 1, the $CO_2$ recovery apparatus 10A according to the first embodiment includes a $CO_2$ absorber, a regenerator 15, first compressor 29-1 to fourth compressor 29-4, and an oxygen reducing apparatus 41. The $CO_2$ absorber brings flue gas that contains $CO_2$ into contact with $CO_2$ absorbing liquid (hereinafter, also referred to as "absorbing liquid") to reduce the $CO_2$ contained in the flue gas. The regenerator 15 reduces $CO_2$ in the absorbing liquid (hereinafter, also referred to as "rich solvent") 14 that has absorbed $CO_2$ in the $CO_2$ absorber to regenerate the $CO_2$ absorbing liquid, so that the regenerated absorbing liquid (hereinafter, also referred to as "lean solvent") 12, having $CO_2$ reduced in the regenerator 15, is reused in the $CO_2$ absorber. The first compressor 29-1 to the fourth compressor 29-4 compress the $CO_2$ gas 16 sent from the regenerator 15. The oxygen reducing apparatus 41 is arranged between the second compressor 29-2 and a second cooler 30-2 to reduce $O_2$ contained in the $CO_2$ gas 16.

The rich solvent 14 is supplied from the $CO_2$ absorber into the regenerator 15 through the top thereof, via a rich solvent supplying pipe 42. The rich solvent 14 is discharged through a nozzle 43 located at the upper portion of the regenerator 15, and causes an exothermic reaction, releasing a majority of the $CO_2$. The $CO_2$ absorbing liquid that has released some or a majority of the $CO_2$ in the regenerator 15 is called semi-lean solvent. By the time the semi-lean solvent reaches the bottom of the regenerator 15, almost all of the $CO_2$ is removed, turning the semi-lean solvent into the absorbing liquid (lean solvent) 12. The lean solvent 12 is then heated by the steam 23 in the regenerating heater 22, causing part of the lean solvent 12 to evaporate, supplying steam inside the regenerator 15.

In FIG. 1, the reference numeral 15A denotes to a packed bed laid in the regenerator 15; the reference numeral 44 denotes to a chimney tray; the reference numeral 45 denotes to a separating drum for recovery the steam 23 that has exchanged heat with the lean solvent 12; the reference numeral 46 denotes to water that is a condensed steam separated in the separating drum 45.

The $CO_2$ gas 16, including the steam released from the rich solvent 14 and the semi-lean solvent, is released into the regenerator 15 through the top thereof, via the gas ejecting line 25. The steam in the $CO_2$ gas 16 is condensed in the condenser 26, and the water 28 is separated in the separating drum 27. The $CO_2$ gas 16 is released out of the system, and recovered separately. The water 28 separated in the separating drum 27 is sent to the top of the regenerator 15 by way of the condensed-water circulating pump 35.

The regenerated absorbing liquid (lean solvent) 12 is ejected from the bottom of the regenerator 15, and exchanges heat with the rich solvent 14 to be cooled down. The pressure of the regenerated absorbing liquid 12 is then raised, and the regenerated absorbing liquid 12 is further cooled down and sent to the $CO_2$ absorber.

The $CO_2$ gas 16 recovered from the regenerator 15 and including the steam is compressed in the first compressor 29-1 to the fourth compressor 29-4. More specifically, after being compressed in the first compressor 29-1, the $CO_2$ gas 16 is cooled in the first cooler 30-1. Then, the water in the $CO_2$ gas 16 is separated in the first separator 31-1, and the $CO_2$ gas 16 is sent to the second compressor 29-2. The same process is performed in the second compressor 29-2 to the fourth compressor 29-4, and the pressure of the $CO_2$ gas 16 is gradually raised, and the $CO_2$ gas 16 becomes compressed.

The oxygen reducing apparatus 41 is arranged between the second compressor 29-2 and the second cooler 30-2 to reduce $O_2$ contained in the $CO_2$ gas 16 supplied thereto. According to the first embodiment, the oxygen reducing apparatus 41 includes a combustion catalyst 47 for reducing $O_2$ in the $CO_2$ gas 16. The combustion catalyst 47 that is a granular catalyst having a pellet or spherical shape is packed into a packed bed structure. The oxygen reducing apparatus 41 also includes a hydrogen ($H_2$) gas supplying unit 49 that supplies hydrogen ($H_2$)-rich gas 48 into the oxygen reducing apparatus 41. By introducing the $H_2$-rich gas 48 into the oxygen reducing apparatus 41, $O_2$ contained in the $CO_2$ gas 16 that is supplied to the oxygen reducing apparatus 41 reacts with $H_2$. In this manner, $O_2$ included in the $CO_2$ gas 16 can be reduced.

In the manner described above, by reducing the $O_2$ contained in the $CO_2$ gas 16 recovered from the regenerator 15, it is possible to suppress problems caused by residual oxygen coexisting with residual $H_2S$ or $H_2O$, such as clogging of equipment or pipes, or coloring of chemical products.

For example, assuming that the concentration of $O_2$ contained in the $CO_2$ gas 16 that is supplied to the oxygen reducing apparatus 41 is approximately several hundred parts per million; the gas temperature of the $CO_2$ gas 16 is approximately 150 Celsius degrees; and the space velocity (SV) of the combustion catalyst 47 is approximately 10,000 $h^{-1}$; then, the $O_2$ concentration of the $CO_2$ gas 16 can be reduced to equal to or less than several tens of parts per million by the time the $CO_2$ gas 16 is ejected from the oxygen reducing apparatus 41.

The $H_2$-rich gas 48 is not limited to a gas containing $H_2$ as an only gas component, but may be any gas as long as a large amount of $H_2$ is contained therein as a gas component. For example, the $H_2$-rich gas 48 may contain CO as a gas component in addition to $H_2$. Such CO contained in the $H_2$-rich gas 48 is caused to react with $O_2$ by way of the combustion catalyst 47, and to be converted into $CO_2$.

A method for producing the $H_2$-rich gas 48 introduced into the oxygen reducing apparatus 41 is not especially limited; a hydrogen producing apparatus, performing a reforming process and a CO shifting process, may be used to produce $H_2$ using a fossil fuel as a raw material, and such $H_2$ may be introduced to the oxygen reducing apparatus 41 as the $H_2$-rich gas. Gas generated by using a fossil fuel as a raw material can be efficiently utilized by using the gas as the $H_2$-rich gas 48 that is as a combustible gas required for reducing $O_2$ included in the $CO_2$ gas 16.

A catalyst used as the combustion catalyst 47 is also not especially limited; any catalyst may be used as long as such a catalyst can cause $O_2$ in the $CO_2$ gas 16 to react with $H_2$, and is preferably a Pd-based or Pt-based metal catalyst, for example.

Furthermore, in the $CO_2$ recovery apparatus 10A according to the first embodiment, the oxygen reducing apparatus 41 includes the combustion catalyst 47, and a granular catalyst, having a pellet or spherical shape packed into a packed bed structure, is used as the combustion catalyst 47; however, the oxygen reducing apparatus 41 have any structure as long as such a structure can reduce $O_2$ contained in the $CO_2$ gas 16. For example, the oxygen reducing apparatus 41 may be a cartridge including the combustion catalyst 47 and being able to be assembled into a pipe for supplying the $CO_2$ gas 16 to be compressed. Alternatively, the oxygen reducing apparatus 41 may be structured as a static mixer or a honeycomb having a surface thereof applied with the combustion catalyst 47. By using the oxygen reducing apparatus 41 having such structures, $O_2$ contained in the $CO_2$ gas 16 can be efficiently reduced.

In the $CO_2$ recovery apparatus 10A according to the first embodiment, the oxygen reducing apparatus 41 is arranged between the second compressor 29-2 and the second cooler 30-2. To reduce $O_2$ in the $CO_2$ gas 16 efficiently, it is better when the gas temperature of the $CO_2$ is high. If the oxygen reducing apparatus 41 is arranged upstream of the cooler, rather than downstream thereof, the $CO_2$ gas 16 can be supplied into the oxygen reducing apparatus 41 at a higher gas temperature. Therefore, the oxygen reducing apparatus 41 is positioned upstream of the second cooler 30-2. Furthermore, the $H_2$-rich gas 48 can be introduced into the oxygen reducing apparatus 41 at a lower pressure, if the oxygen reducing apparatus 41 is arranged at a position at a lower pressure, for example, at a position downstream of the first compressor 29-1 or the second compressor 29-2, rather than a position downstream of the third compressor 29-3 or the fourth compressor 29-4. For the reason above, the oxygen reducing apparatus 41 is arranged downstream of the second compressor 29-2. Therefore, according to the first embodiment, the oxygen reducing apparatus 41 is arranged between the second compressor 29-2 and the second cooler 30-2.

Moreover, although the oxygen reducing apparatus 41 is arranged between the second compressor 29-2 and the second cooler 30-2 in the $CO_2$ recovery apparatus 10A according to the first embodiment, the oxygen reducing apparatus 41 may also be arranged between the first separator 31-1 and the second separator 31-2. When the combustion catalyst 47 is arranged in the oxygen reducing apparatus 41, the combustion catalyst 47 must be prevented from deteriorating by being brought into contact with water in the $CO_2$ gas 16. While compressing the $CO_2$ gas 16, more water is generated in the first compressor 29-1, in comparison with that generated in other compressors. Therefore, the water generated in the first compressor 29-1 must be removed in the first separator 31-1. For this reason, the oxygen reducing apparatus 41 is arranged downstream of the first separator 31-1. Although water is generated by the reaction between $O_2$, contained in the $CO_2$ gas 16, and $H_2$ in the oxygen reducing apparatus 41, such water is prevented from being transported into the third compressor 29-3. Therefore, the oxygen reducing apparatus 41 is arranged upstream of the second separator 31-2.

Figure 2:
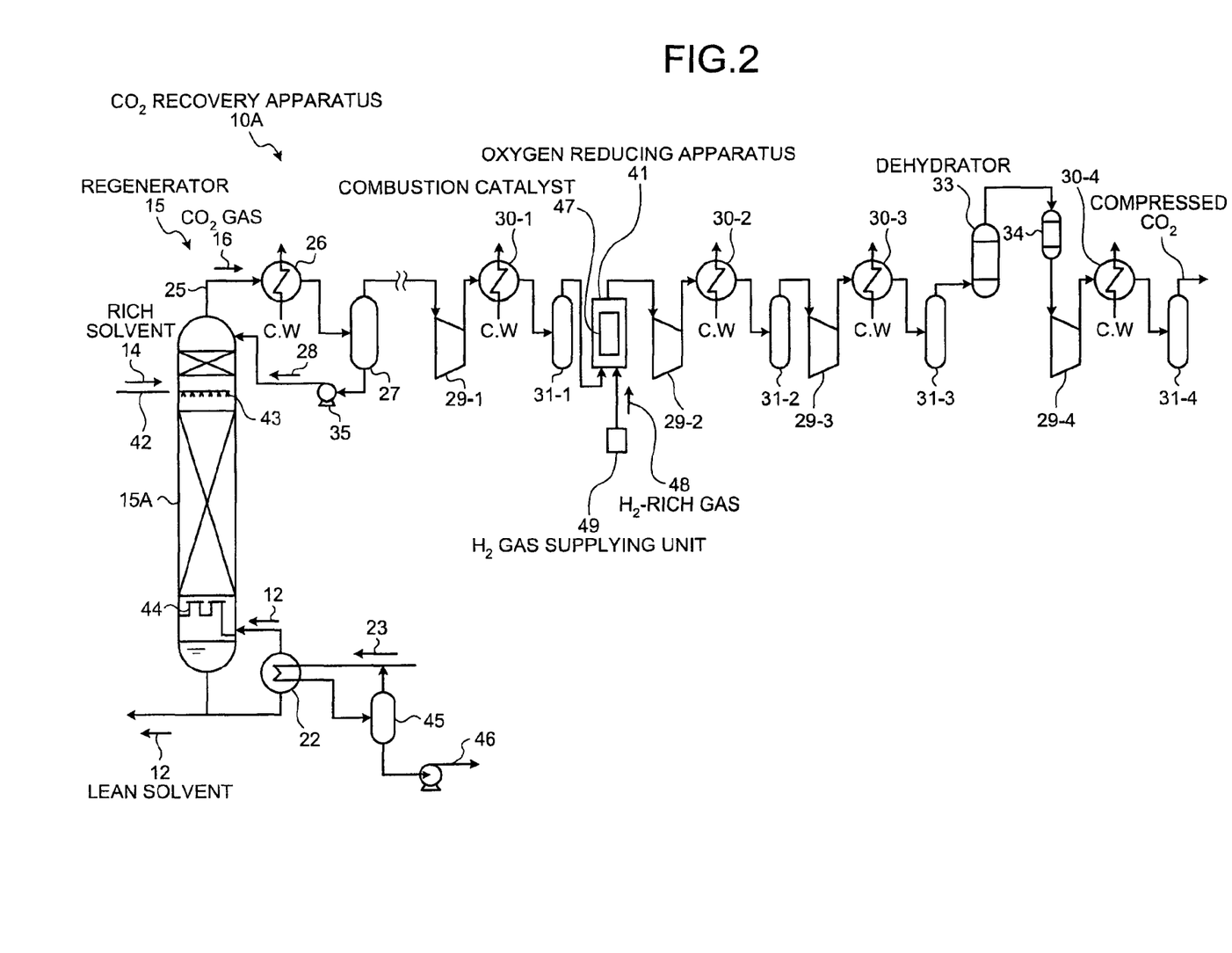
FIG. 2 is a schematic of another structure of the $CO_2$ recovery apparatus according to the first embodiment.

Alternatively, the oxygen reducing apparatus 41 may also be arranged between the first separator 31-1 and the second compressor 29-2, as shown in FIG. 2. In this arrangement, only specific catalysts, such as Pt, can be used as the combustion catalyst 47; at the same time, the $H_2$ gas introduced into the oxygen reducing apparatus 41 must be greater in purity.

In the $CO_2$ recovery apparatus 10A according to the first embodiment, as long as less amount of water is generated while compressing the $CO_2$ gas 16, the combustion catalyst 47 in the oxygen reducing apparatus 41 can be prevented from deteriorating. Therefore, the oxygen reducing apparatus 41 may be arranged downstream of the third compressor 29-3 or the fourth compressor 29-4 that is positioned more downstream than the second compressor 29-2.

Furthermore, the dehydrator 33 is arranged between the third compressor 29-3 and the fourth compressor 29-4. By bringing the $CO_2$ gas 16 into contact with dehydrating agent (e.g., molecular sieve, DEG, or TEG), the water can be removed, and the $CO_2$ gas 16 can be dehydrated.

Furthermore, in the $CO_2$ recovery apparatus 10A according to the first embodiment, four compressors are arranged; however, the number of compressors can be changed as appropriate, depending on the compression ratio of the $CO_2$ gas 16.

Furthermore, cooling water C.W is used as a low-temperature medium that exchanges heat with the $CO_2$ gas 16 in the first cooler 30-1 to the fourth cooler 30-4; however, such a medium is not limited to the cooling water C.W, and may also be tap water, industrial waste water, or sea water, as long as such water is lower in temperature than the $CO_2$ gas 16.

In summary, the $CO_2$ recovery apparatus 10A according to the first embodiment includes: the oxygen reducing apparatus 41 arranged between the second compressor 29-2 and the second cooler 30-2; and having the combustion catalyst 47; and the $H_2$ gas supplying unit 49 that introduces the $H_2$-rich gas 48 into the oxygen reducing apparatus 41. By way of such a structure, $O_2$ contained in the $CO_2$ gas 16 that is supplied into the oxygen reducing apparatus 41 can be reduced by way of the combustion catalyst 47 using the $H_2$-rich gas 48 as the combustible gas in the oxygen reducing apparatus 41. In addition, the gas generated by using a fossil fuel as a raw material can be efficiently utilized by using the $H_2$-rich gas 48 as a combustible gas required for removing the $O_2$ contained in the $CO_2$ gas 16.

The absorbing liquid that can be used for the present invention is not especially limited. Examples thereof include alkanolamines or hindered amines having alcoholic hydroxyl groups. Such alkanolamine includes monoethanolamine, diethanolamine, triethanolamine, methyldiethanolamine, diisopropanolamine, and diglycolamine; however, usually monoethanol amine (MEA) is preferred. Examples of the hindered amines having alcoholic hydroxyl groups include 2-amino-2-methyl-1-propanol (AMP), 2-(ethylamino)-ethanol (EAE), or 2-(methylamino)-ethanol (MAE).

A type of the heat exchanger used in the first embodiment is also not especially limited, and a known heat exchanger, such as plate heat exchanger or a shell and tube heat exchanger, may be used.

Second Embodiment

Figure 3:
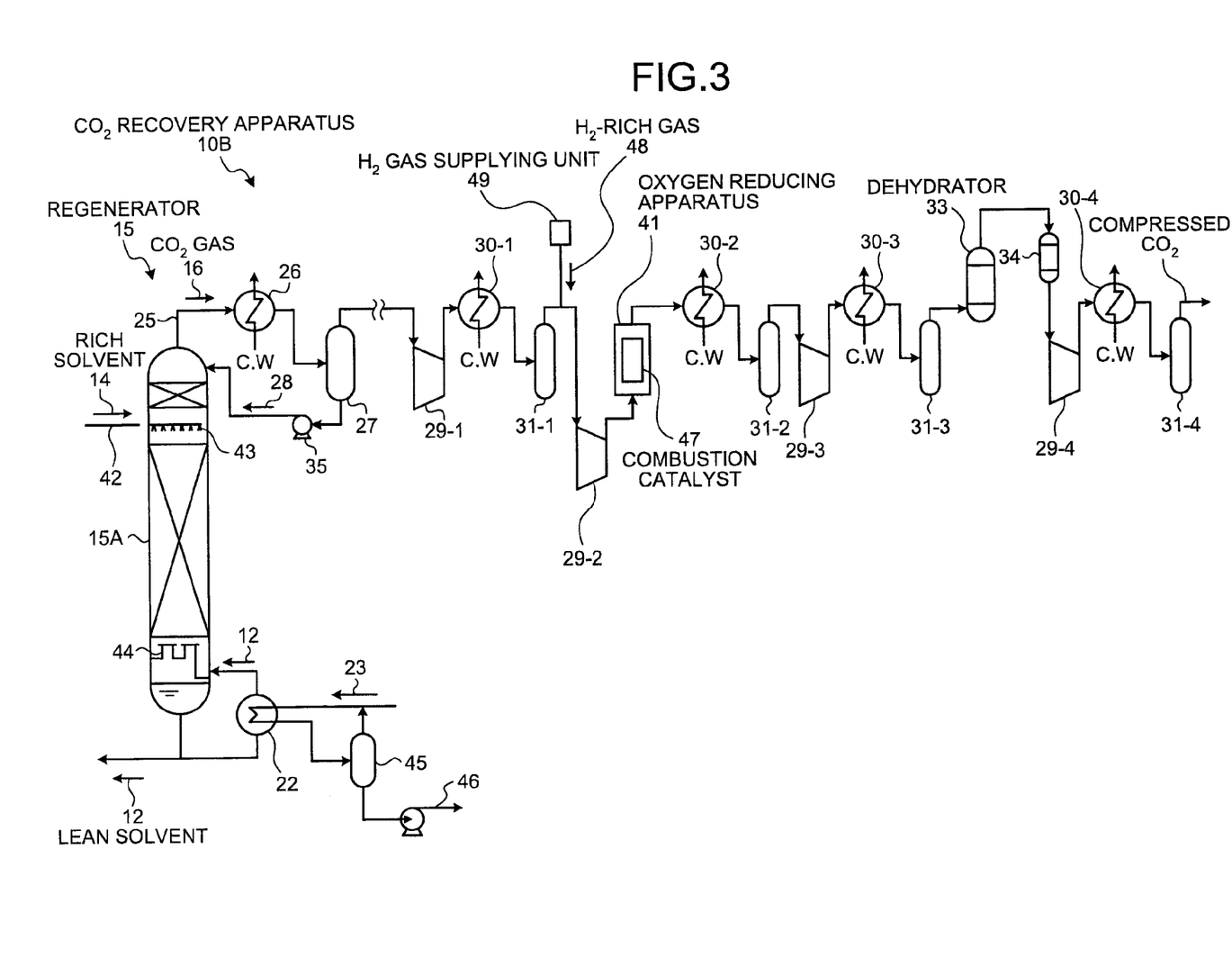
FIG. 3 is a schematic of a $CO_2$ recovery apparatus according to a second embodiment of the present invention.

FIG. 3 is a schematic of a $CO_2$ recovery apparatus according to a second embodiment of the present invention. The $CO_2$ recovery apparatus according to the second embodiment will now be explained with reference to FIG. 3. The same structures as those according to the first embodiment are assigned with the same reference numerals, and redundant explanations thereof are omitted.

In a $CO_2$ recovery apparatus 10B according to the second embodiment, the $H_2$ gas supplying unit 49, for supplying the $H_2$-rich gas 48, is arranged between the first separator 31-1 and the second compressor 29-2.

By introducing the $H_2$-rich gas 48 into the $CO_2$ gas 16 from the $H_2$ gas supplying unit 49 arranged between the first separator 31-1 and the second compressor 29-2, the $H_2$-rich gas 48 can be introduced from the $H_2$ gas supplying unit 49 to the $CO_2$ gas 16 without the pressure thereof being raised any further. In this manner, the $CO_2$ gas 16 can be mixed with the $H_2$-rich gas 48 well, allowing $H_2$ to be mixed with the $CO_2$ gas 16 sufficiently. In this manner, it is possible to improve $O_2$ combustion efficiency of the combustion catalyst 47 in the oxygen reducing apparatus 41, preventing unevenness in the reaction thereof with the $O_2$ contained in the $CO_2$ gas 16.

Therefore, in the $CO_2$ recovery apparatus 10B according to the second embodiment, $O_2$ in the $CO_2$ gas 16 can be reduced more efficiently.

With the $CO_2$ recovery apparatus of the present invention, it is possible to reduce oxygen concentration in the $CO_2$ gas recovered from the regenerator, further to suppress problems caused by residual oxygen, such as clogging of equipment or pipes, or coloring of chemical products.

What is claimed is:
1. A $CO_2$ recovery apparatus comprising:
   a $CO_2$ absorber that brings flue gas containing $CO_2$ into contact with $CO_2$ absorbing liquid to reduce $CO_2$ in the flue gas;

a regenerator that reduces $CO_2$ in rich solvent that has absorbed $CO_2$ in the $CO_2$ absorber, so that lean solvent having $CO_2$ reduced by the regenerator is reused in the $CO_2$ absorber;

at least two compressors that compress $CO_2$ gas released from the regenerator; and an oxygen reducing apparatus that reduces $O_2$ in the $CO_2$ gas and is arranged between a first separator arranged downstream of a first compressor and a second separator arranged downstream of a second compressor.

2. The $CO_2$ recovery apparatus according to claim 1, wherein the oxygen reducing apparatus is arranged between the second compressor and a second cooler that is arranged downstream of the second compressor and upstream of the second separator.

3. The $CO_2$ recovery apparatus according to claim 1, wherein the oxygen reducing apparatus includes a combustion catalyst that reduces $O_2$ in the $CO_2$ gas.

4. The $CO_2$ recovery apparatus according to claim 3, wherein the oxygen reducing apparatus includes the combustion catalyst, and is structured as a cartridge that is configured to be assembled into a pipe for supplying compressed $CO_2$ gas, a static mixer or a honeycomb having a surface thereof applied with the combustion catalyst, or a packed bed packed with granular catalysts having a pellet or spherical shape.

5. The $CO_2$ recovery apparatus according to claim 3, wherein the combustion catalyst is a Pd-based or Pt-based metal catalyst.

6. The $CO_2$ recovery apparatus according to claim 3, wherein the oxygen reducing apparatus includes a hydrogen gas supplying unit that supplies hydrogen-rich gas.

7. The $CO_2$ recovery apparatus according to claim 6, wherein the hydrogen-rich gas is hydrogen produced by a hydrogen producing apparatus performing a reforming process and a CO shifting process and using a fossil fuel as a raw material.

8. The $CO_2$ recovery apparatus according to claim 6, wherein the hydrogen-rich gas contains CO in addition to hydrogen.

9. The $CO_2$ recovery apparatus according to claim 1, wherein the hydrogen gas supplying unit is arranged upstream of a compressor that is arranged upstream of the oxygen reducing apparatus.

10. A $CO_2$ recovery method comprising recovering $CO_2$ using the $CO_2$ recovery apparatus according to claim 1, while reducing oxygen concentration in the $CO_2$ gas recovered from the regenerator at a process of compressing the $CO_2$ gas.

* * * * *